(12) United States Patent
Gattiker et al.

(10) Patent No.: US 8,914,272 B2
(45) Date of Patent: Dec. 16, 2014

(54) VISUALIZING SENSITIVITY INFORMATION IN INTEGRATED CIRCUIT DESIGN

(75) Inventors: Anne Elizabeth Gattiker, Austin, TX (US); Sani Richard Nassif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/325,244

(22) Filed: Dec. 14, 2011

(65) Prior Publication Data

US 2013/0158953 A1    Jun. 20, 2013

(51) Int. Cl.
*G06F 17/50* (2006.01)

(52) U.S. Cl.
USPC .................................. 703/15; 703/1

(58) Field of Classification Search
CPC . G06F 17/50; G06F 17/5031; G06F 17/5081; G06F 17/5068; G06F 17/5045
USPC ..................... 703/13, 14, 51, 1, 15
See application file for complete search history.

(56) References Cited

U.S. PATENT DOCUMENTS

| | | | |
|---|---|---|---|
| 7,493,574 B2 | 2/2009 | Liu et al. | |
| 7,707,533 B2 | 4/2010 | McConaghy et al. | |
| 7,761,834 B2 | 7/2010 | McConaghy et al. | |
| 2009/0031271 A1 | 1/2009 | White et al. | |
| 2009/0164194 A1 | 6/2009 | Shrivastava et al. | |

OTHER PUBLICATIONS

Ma et al. (A Design Platform for Analog Device Size Sensitivity Analysis and Visualization, 2010, IEEE).*
Alexander K. Schoemig (On the corrupting influence of variability in semiconductor manufacturing, 1999, Infineon Technologies AG).*

\* cited by examiner

*Primary Examiner* — Omar Fernandez Rivas
*Assistant Examiner* — Iftekhar Khan
(74) *Attorney, Agent, or Firm* — Garg Law Firm, PLLC; Rakesh Garg; William J. Stock

(57) ABSTRACT

A method, system, and computer program product for visualizing sensitivity information in integrated circuit (IC) design are provided in the illustrative embodiments. A plurality of sensitivity information corresponding to a first component in the IC design is received, wherein the plurality of sensitivity information includes a first sensitivity information indicating a first variation in a first electrical characteristic of a group of components as a result of a variation in an electrical characteristic of the first component. A plurality of aspects of the first sensitivity information are rendered in visual form to form a first visualization. The first visualization is presented on a schematic view of the IC design in an IC design tool such that the first sensitivity information is visually associated with the first component in the IC design.

22 Claims, 12 Drawing Sheets

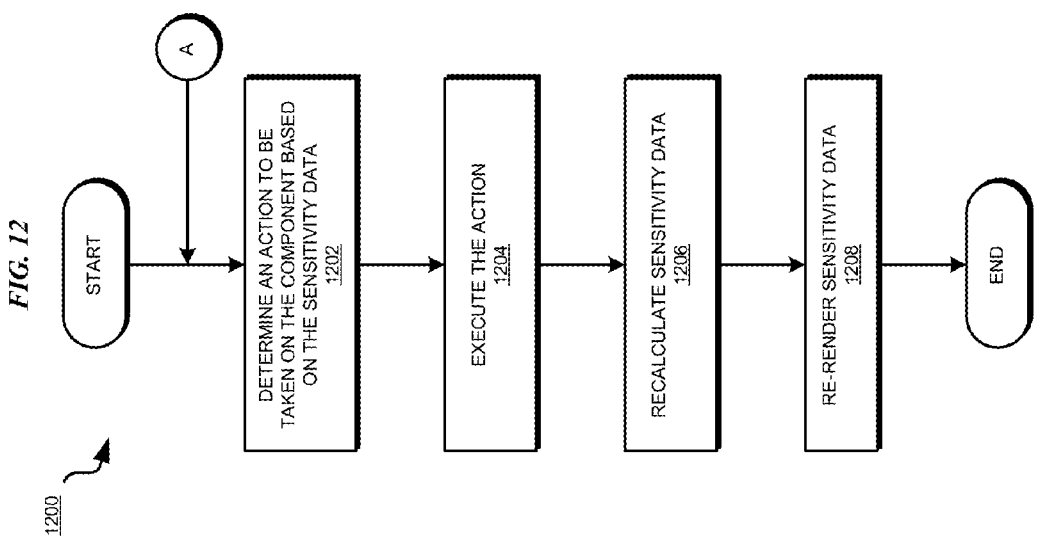

VISUALIZING SENSITIVITY INFORMATION IN INTEGRATED CIRCUIT DESIGN

TECHNICAL FIELD

The present invention relates generally to a computer implemented method, system, and computer program product for integrated circuit (IC) design. Particularly, the present invention relates to a computer implemented method, system, and computer program product for visualizing sensitivity information in integrated circuit design.

BACKGROUND

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry. An interconnected group of components is called a net.

A threshold voltage is a voltage required to operate a component in a circuit. For example, a metal oxide field effect transistor (MOSFET) has a gate that operates at a threshold voltage. When the threshold voltage or a higher voltage is applied to the gate the MOSFET is turned on and provides a conductive path. When the voltage applied to the gate is below the threshold voltage the MOSFET is turned off.

Once a design layout (layout) has been finalized for an IC, the design is converted into a set of masks or reticles. A set of masks or reticles is one or more masks or reticles. During manufacture, a semiconductor wafer is exposed to light or radiation through a mask to form microscopic components of the IC. This process is known as photolithography.

A layout includes shapes that the designer selects and positions to achieve a design function. A manufacturing objective is to have the shape—the target shape—appear on the wafer as designed. However, the shapes may not appear exactly as designed when manufactured on the wafer through photolithography. For example, a rectangular shape with sharp corners may appear as a rectangular shape with rounded corners on the wafer.

A manufacturing mask is a mask usable for successfully manufacturing or printing the contents of the mask onto wafer. During the printing process, radiation is focused through the mask and at certain desired intensity of the radiation. This intensity of the radiation is commonly referred to as "dose". The focus and the dosing of the radiation have to be precisely controlled to achieve the desired shape and electrical characteristics on the wafer.

SUMMARY

The illustrative embodiments provide a method, system, and computer program product for visualizing sensitivity information in integrated circuit design. An embodiment receives, at an application executing in a data processing system, a plurality of sensitivity information corresponding to a first component in the IC design, wherein the plurality of sensitivity information includes a first sensitivity information indicating a first variation in a first electrical characteristic of a group of components as a result of a variation in an electrical characteristic of the first component. The embodiment renders a plurality of aspects of the first sensitivity information in visual form to form a first visualization. The embodiment presents the first visualization on a schematic view of the IC design in an IC design tool such that the first sensitivity information is visually associated with the first component in the IC design.

BRIEF DESCRIPTION OF THE SEVERAL VIEWS OF THE DRAWINGS

The novel features believed characteristic of the embodiments are set forth in the appended claims. An embodiment of the invention itself, however, as well as a preferred mode of use, further objectives and advantages thereof, will best be understood by reference to the following detailed description of an illustrative embodiment when read in conjunction with the accompanying drawings, wherein:

FIG. 12 depicts a flowchart of an example process of actuating sensitivity information visualization in accordance with an illustrative embodiment; and FIG. 13 depicts a flowchart of an example process of visualizing sensitivity information in an IC design in accordance with an illustrative embodiment.

DETAILED DESCRIPTION

Figure 1:
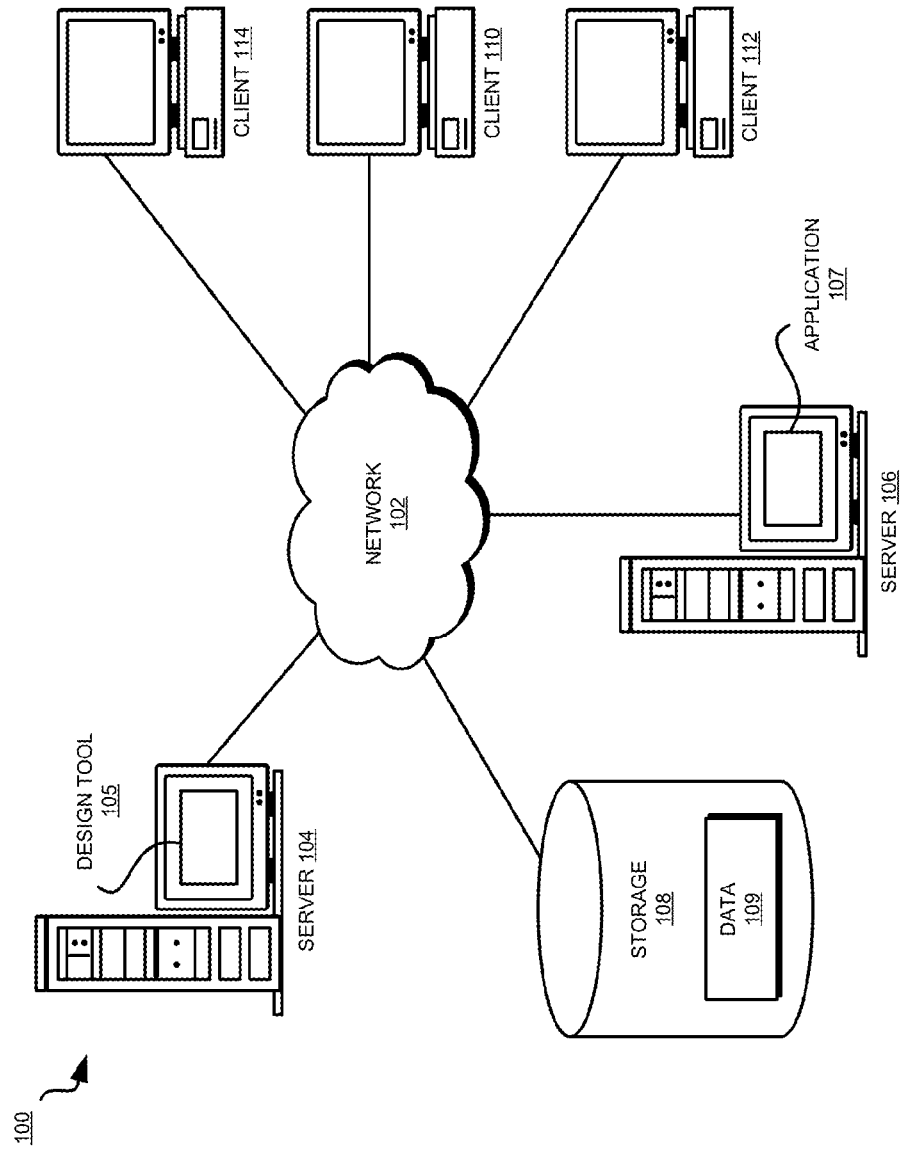
FIG. 1 depicts a pictorial representation of a network of data processing systems in which illustrative embodiments may be implemented.

Even when a design conforms to the design-specifications and tolerances, an IC produced based on the design may not so conform. Variations introduced during the manufacturing process in the fabricated circuit cause the resulting hardware to differ from the hardware expected from the design.

For example, typically hundreds of copies of a given IC can be fabricated on a single silicon wafer. Manufacturing variations can cause certain characteristics of the IC to vary from one copy to another on the same wafer or from wafer to wafer. Such variations are called die-to-die variations.

Furthermore, within an IC a component or a set of components may be repeated. For example, a transistor of a common specification may appear in two or more different places in the IC. Manufacturing variations can cause certain characteristics of the component to vary from one copy to another within the same IC or die. Such variations are called within-die variations.

An embodiment of the invention recognizes that manufacturing variability is presently one of the biggest problems in circuit design, and promises to become more severe as the technology improves to permit fabrication of increasingly smaller components onto an IC. An embodiment recognizes that ICs have to be robust to accommodate die-to-die and within-die variations in the IC manufacturing process and still perform as designed.

The ability of an IC (die) as a whole or of a component therein, to be affected by variables such as manufacturing process parameters, supply voltage, temperature, designable parameters and matching between devices is called sensitivity. Sensitivity is measured against metrics such as power, performance, and yield or component characteristics such as transistor width, drive strength or matching. In other words, a die's sensitivity is the die's vulnerability to be affected by variables such as manufacturing process parameters, supply voltage, temperature, designable parameters and matching between devices. Similarly, a component's sensitivity is the component's vulnerability to be affected by variables such as manufacturing process parameters, supply voltage, temperature, designable parameters and matching between devices.

An embodiment recognizes that ICs can be improved by making design changes that ensure desirable behavior relative to the metrics at various values of the parameters to which the design is sensitive. An embodiment further recognizes that sensitivity information can be useful in determining, building, or correcting the robustness of components in an IC during the design process.

Furthermore, an embodiment recognizes that knowing how to make such changes is non-trivial. For example, a component may be adversely affected in the component's power by one manufacturing variation. The same component or a second component related to the component may be adversely affected in the component's performance by another manufacturing variation. As another example, the same component or a third component related to the component may be positively affected in the component's performance by the same manufacturing variation. As the embodiments recognize, power and performance variations can suggest design manipulations in opposite directions.

As the embodiment recognizes, often a design rectification to improve performance is the opposite of a design rectification to improve power. Therefore, to improve the component's power robustness further degrades the component's performance, and vice versa. Thus, determining the design modifications to address sensitivities such as manufacturing process related variations is a difficult problem to solve especially when such related information is not readily available during the design phase.

An embodiment may be implemented to address a variety of sensitivities, including, but not limited to, those described above. Sensitivity to manufacturing process variation is a example of a sensitivity that is difficult to comprehend. Manufacturing variation includes die-to-die and within-die variations. For clarity, the embodiments or features thereof are described herein using manufacturing process-related sensitivities as an example without implying a limitation on the invention. An embodiment can be adapted to address other sensitivities or a combination of several sensitivities in a similar manner within the scope of the invention.

Presently for die-to-die variations, such robustness is verified by selecting a subset of manufacturing-process-related variables at selected portions in the IC design and simulating the operation of those portions at given values of the variables. The simulation is known as "corner" simulation. The corner simulations are performed at functional corners of specific portions of the design to determine whether the design meets the design specifications at each of those corners. Corners also include settings for other variables such as voltage and temperature.

Presently, robustness for within-die variations is typically verified only for known sensitive circuits, such as memories. Furthermore, presently the within-die variation sensitivity is verified by performing statistical circuit simulations, such as Monte Carlo simulation. An embodiment recognizes that as ICs grow increasingly complex and as components shrink in size, within-die variation sensitivity determination has to be performed for other types of circuits as well, such as logic circuits of a processor.

An embodiment further recognizes that while (possibly-replicated) known-sensitive circuits generally tend to be small, having tens to hundreds of components, (possibly-replicated) logic circuits can be significantly larger, containing hundreds to thousands of components. Overall logic circuits can contain tens of millions of components. Accordingly, an embodiment recognizes that managing sensitivity information for a large number of components is a complex task, not performable using mental processes, spreadsheets, tables, or volumes of textual or numeric data, as in the prior art methods.

The illustrative embodiments recognize that a more efficient manner of presenting the sensitivity data is desirable. The illustrative embodiments further recognize that the presentation of the sensitivity data has to be correlated with the corresponding components such that the sensitivity data is comprehensible and usable at the design stage.

The illustrative embodiments used to describe the invention generally address and solve the above-described problems and other problems related to managing the sensitivities information of integrated circuit components. The illustrative embodiments provide a method, system, and computer program product for visualizing sensitivity information in integrated circuit design.

Generally, the illustrative embodiments provide various ways of visually integrating sensitivities information into the schematic design of an integrated circuit. An embodiment allows a designer to view and use during the design process the sensitivity information, however collected, relative to the corresponding component.

An embodiment may further allow a designer to act on the visually rendered sensitivity information. For example, the visual rendering may suggest that a component has to be modified in the same way to achieve improvement across multiple criteria, where the criteria are different cases of functional operation. In that case the designer may make that modification based on the visual rendering.

The illustrative embodiments are described with respect to certain devices or components only as examples. Such descriptions are not intended to be limiting on the illustrative embodiments. For example, an illustrative embodiment described with respect to a transistor can be implemented using a capacitor in an integrated circuit within the scope of the illustrative embodiments.

Similarly, the illustrative embodiments are described with respect to certain sensitivity data (sensitivity information) and visual renderings only as examples. Such descriptions are not intended to be limiting on the illustrative embodiments. For example, an illustrative embodiment described with respect to certain icons, graphics, or images having certain colors, shapes, sizes, or orientations can be implemented using other visual artifacts for a similar purpose, including but not limited to graphical, textual, audible, and tactile artifacts, within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the embodiments of the invention.

The illustrative embodiments are further described with respect to certain applications only as examples. Such descriptions are not intended to be limiting on the embodiments of the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which an embodiment of the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
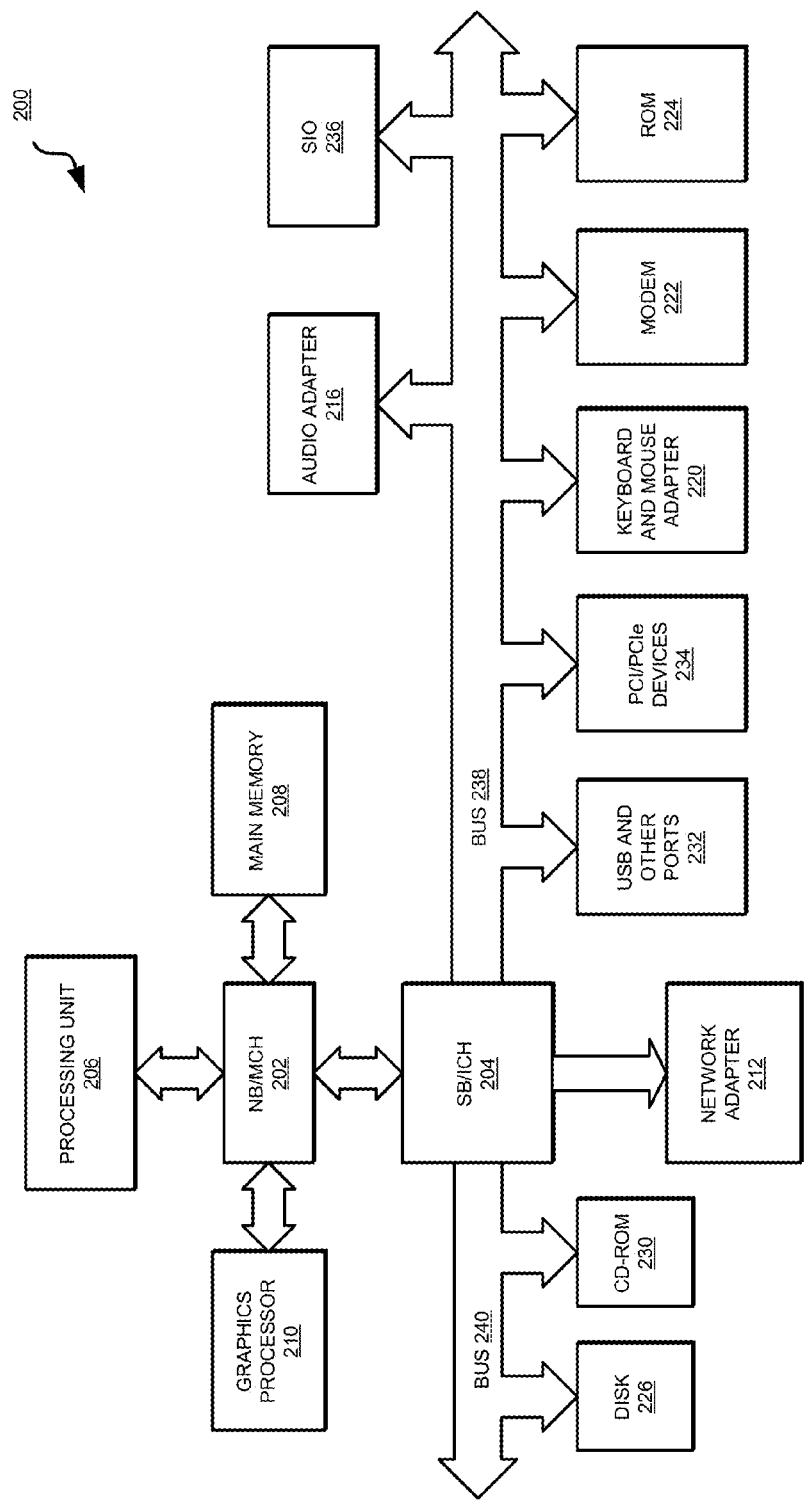
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Design tool 105 may be any suitable software application usable for manipulating a design of an IC. Data 109 may be the sensitivity information according to an embodiment. Application 107 may be an application implementing an embodiment for visualizing sensitivity information 109 in design tool 105.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
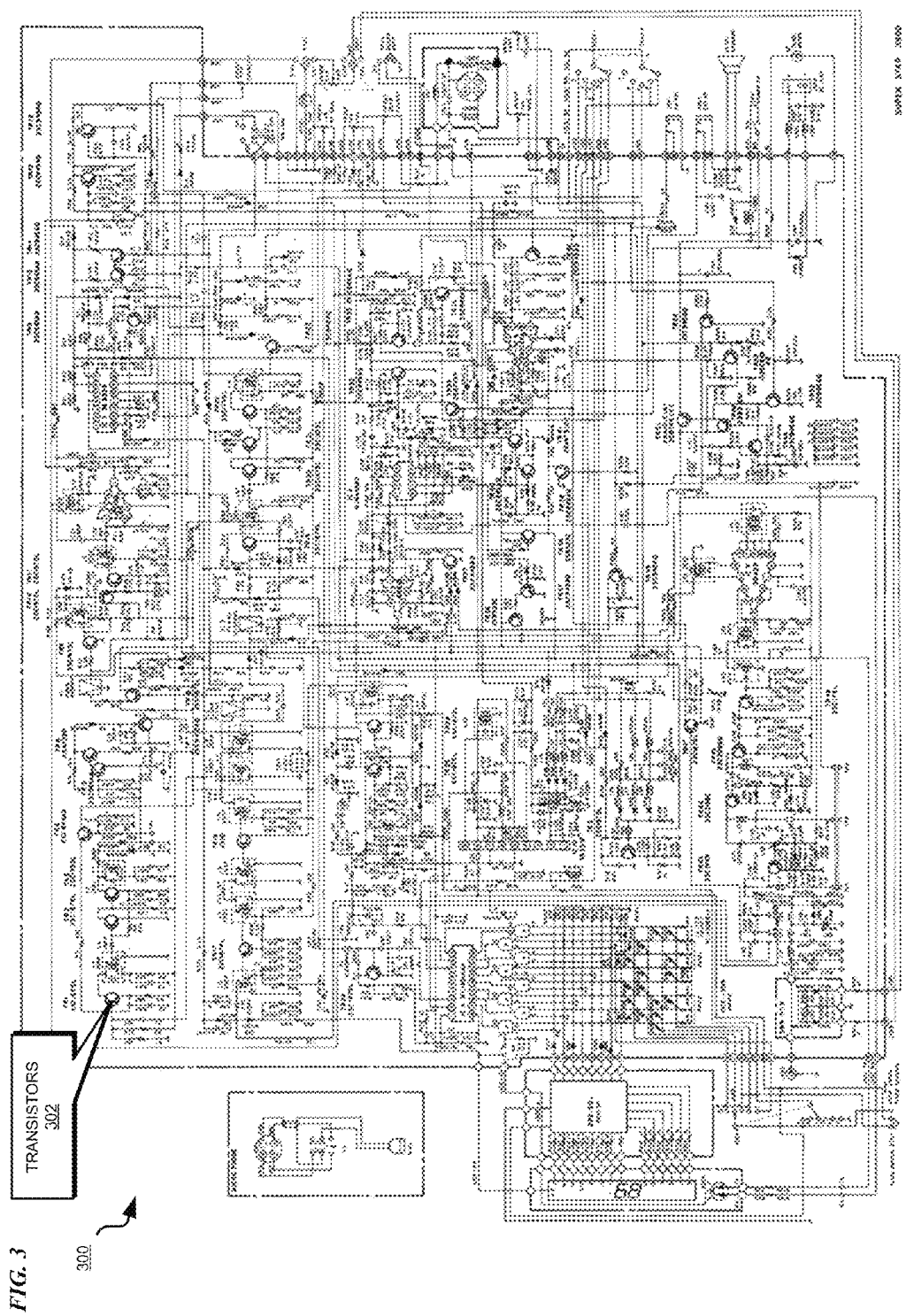
FIG. 3 depicts an example IC design with respect to which an illustrative embodiment may be implemented.

With reference to FIG. 3, this figure depicts an example IC design with respect to which an illustrative embodiment may be implemented. Transistor 302 is an example of a typical component in design 300. Design 300 is an example design of a portion of a typical IC, depicted not to show any particular function of the IC but for appreciating the complexity of a typical IC design and the difficulty in managing sensitivity information relative to the thousands of components depicted therein.

The manufacturing process-related sensitivity is one example type of sensitivity used in this disclosure for simplification of the description. Other types of sensitivities may be substituted for the manufacturing process-related sensitivity within the scope of the embodiments. As an example, transistor 302 may be a component that is adversely affected by manufacturing process related variations. For example, a variation in the photolithography process may cause an n-layer of transistor 302 to have a diffused boundary, thereby exhibiting electrical characteristics different from those contemplated in the design of transistor 302. As an example, the threshold voltage of transistor 302 may be higher than expected due to this example manufacturing process variation.

Some ways of handling a particular sensitivity, such as manufacturing process related variations, may be to change the size of a component. Increasing the size of transistor 302 by twenty percent, for example, may accommodate the diffusion in the n-layer. As an example, consider a latch circuit. A measure of probability of a successful write operation using the latch is denoted as $\sigma$. A value of $\sigma$ lower than a threshold indicates undesirable latch writability, and a higher than threshold value indicates desirable latch writability. The four corners of the example latch's writability may be strong-nfet-weak-pfet writing a 1 (having σ=4.1), strong-nfet-weak-pfet writing a 0 (having σ=4.3), strong-pfet-weak-nfet writing a (having σ=3.7), and strong-pfet-weak-nfet writing a 1 (having σ=4.8). If the threshold value of σ were 4.0, the example latch appears to have an undesirable σ for the corner strong-pfet-weak-nfet writing a 0. Depending on the implementation, strengthening a transistor, such as transistor 302, may improve the σ for this corner. In another implementation, weakening transistor 302 may improve the σ for this corner.

As is evident from this example, managing such information for tens of thousands, perhaps millions of components, is a non-trivial task. Furthermore, as in the prior art, presenting such information in textual or numeric form during the design process makes using such sensitivity information almost an impossible task, particularly for large circuits, such as logic circuits.

Figure 4:
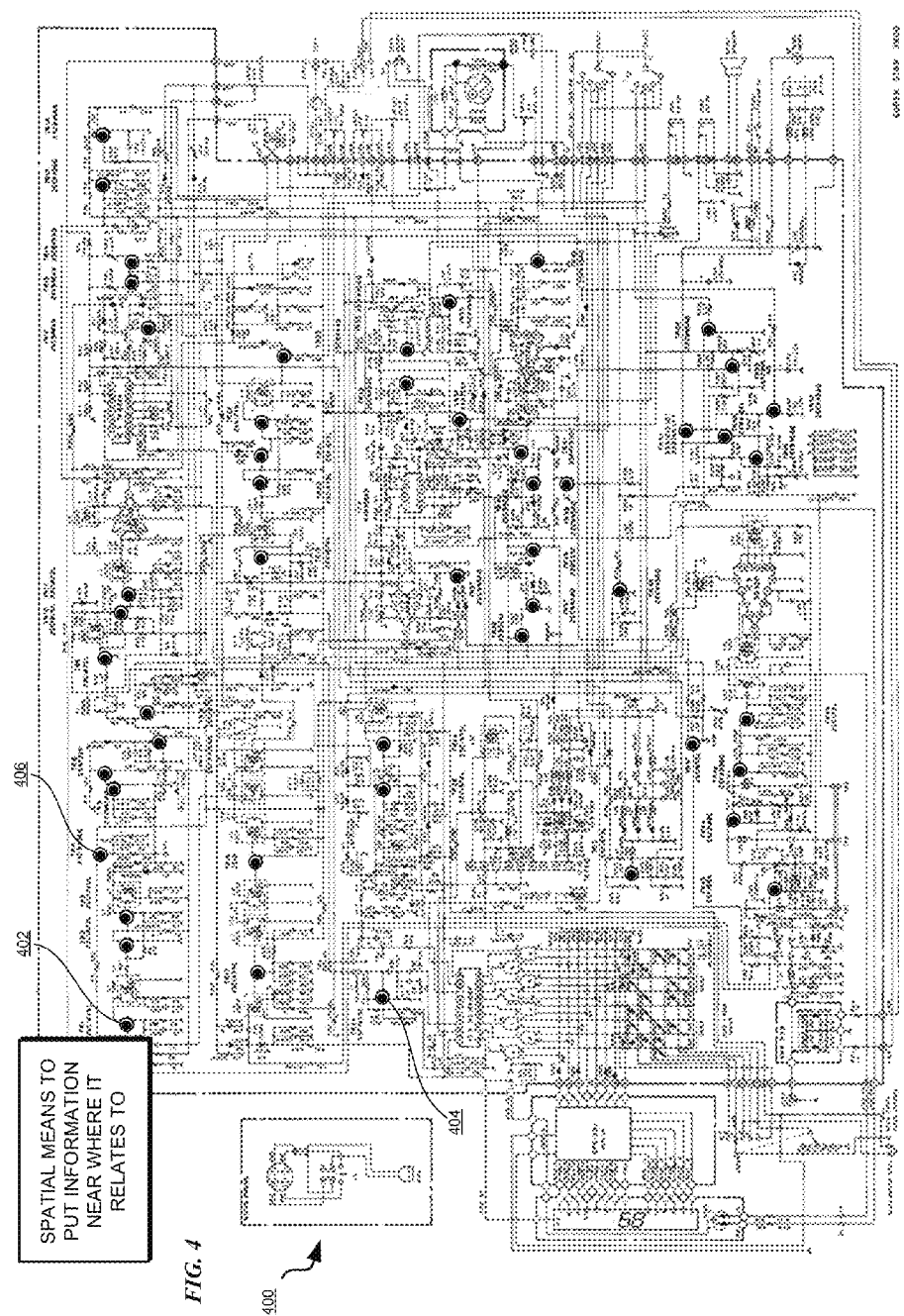
FIG. 4 depicts an example manner of visualizing sensitivity information in an IC design in accordance with an illustrative embodiment.

With reference to FIG. 4, this figure depicts an example manner of visualizing sensitivity information in an IC design in accordance with an illustrative embodiment. Design 400 may be similar to design 300 in FIG. 3.

In a simple visualization, graphical artifacts 402, 404, and 406 depict visual information overlaid on certain components in design 400. Particularly, overlaid graphical artifacts 402, 404, and 406 are proximate to their respective components, such as transistors, that may be adversely affected by one or more manufacturing process related variations or other sensitivities.

Now, even with this simplified visualization of the sensitivity information, a designer is able to comprehend which tens of components in the hundreds of components depicted in design 400 are susceptible to manufacturing variations. As subsequent figures will show, the example visualization of FIG. 3 can be further enhanced to provide many more pieces of sensitivity information and corrective actions relative to the components.

Figure 5:
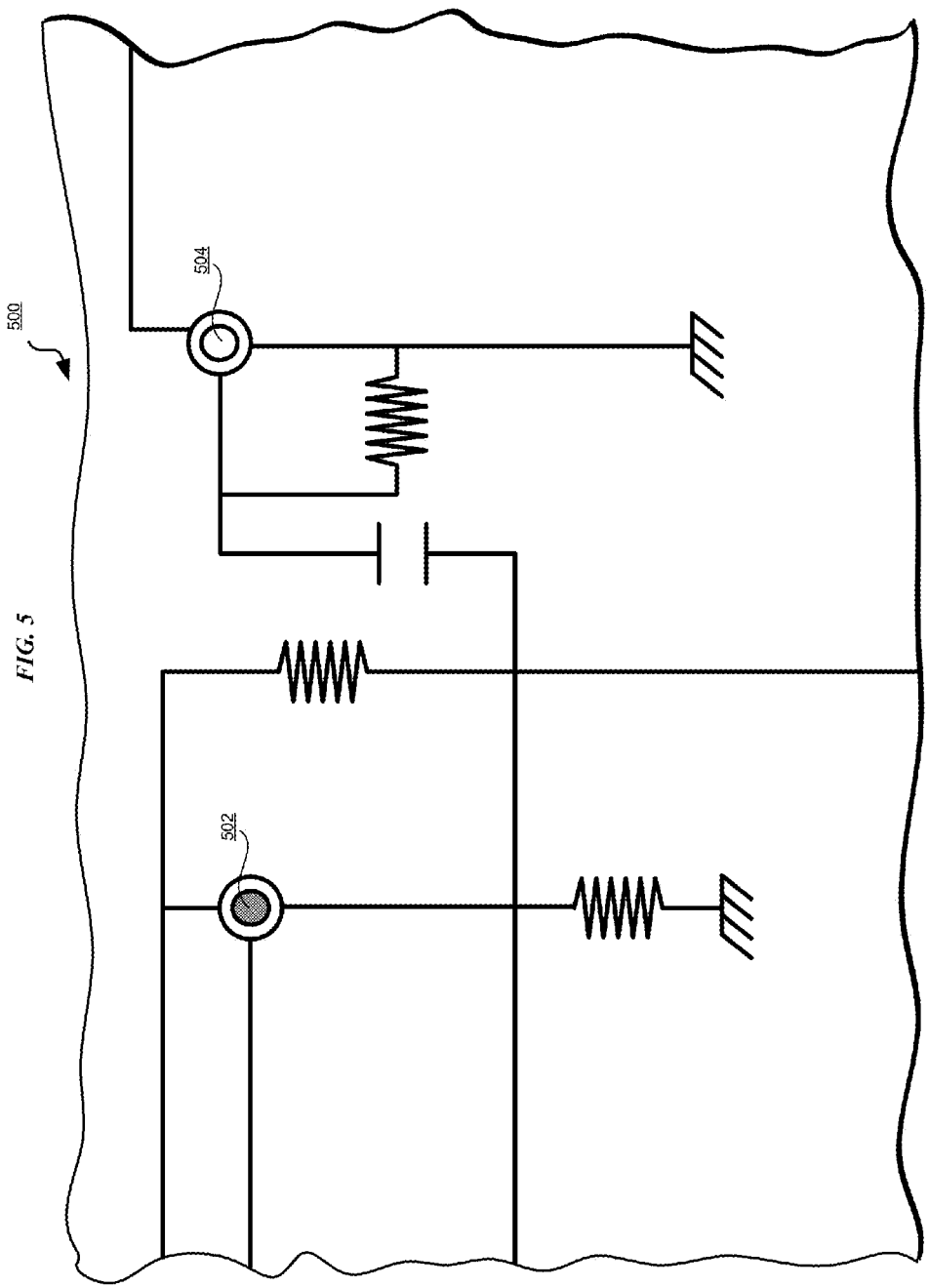
FIG. 5 depicts another example manner of visualizing sensitivity information in an IC design in accordance with an illustrative embodiment.

With reference to FIG. 5, this figure depicts another example manner of visualizing sensitivity information in an IC design in accordance with an illustrative embodiment. Design 500 may be a portion of design 400 in FIG. 4.

Visualization 502 and 504 are example graphical artifacts located proximate to two components (obscured by visualization 502 and 504) in design 500. While the components to which visualizations 502 and 504 pertain are obscured in this example depiction, an implementation may place visualization 502 adjacent to the component to show the component as well as the visualization without departing the scope of the embodiments.

In this example, visualization 502 and 504 are shaded differently to indicate different sensitivities, different values of the same sensitivity, or a combination thereof. In one embodiment, visualization 502 and 504 may be of different colors, shading, shapes, orientation, or relative position with respect to the components of design 500 with which they each relate.

Figure 6:
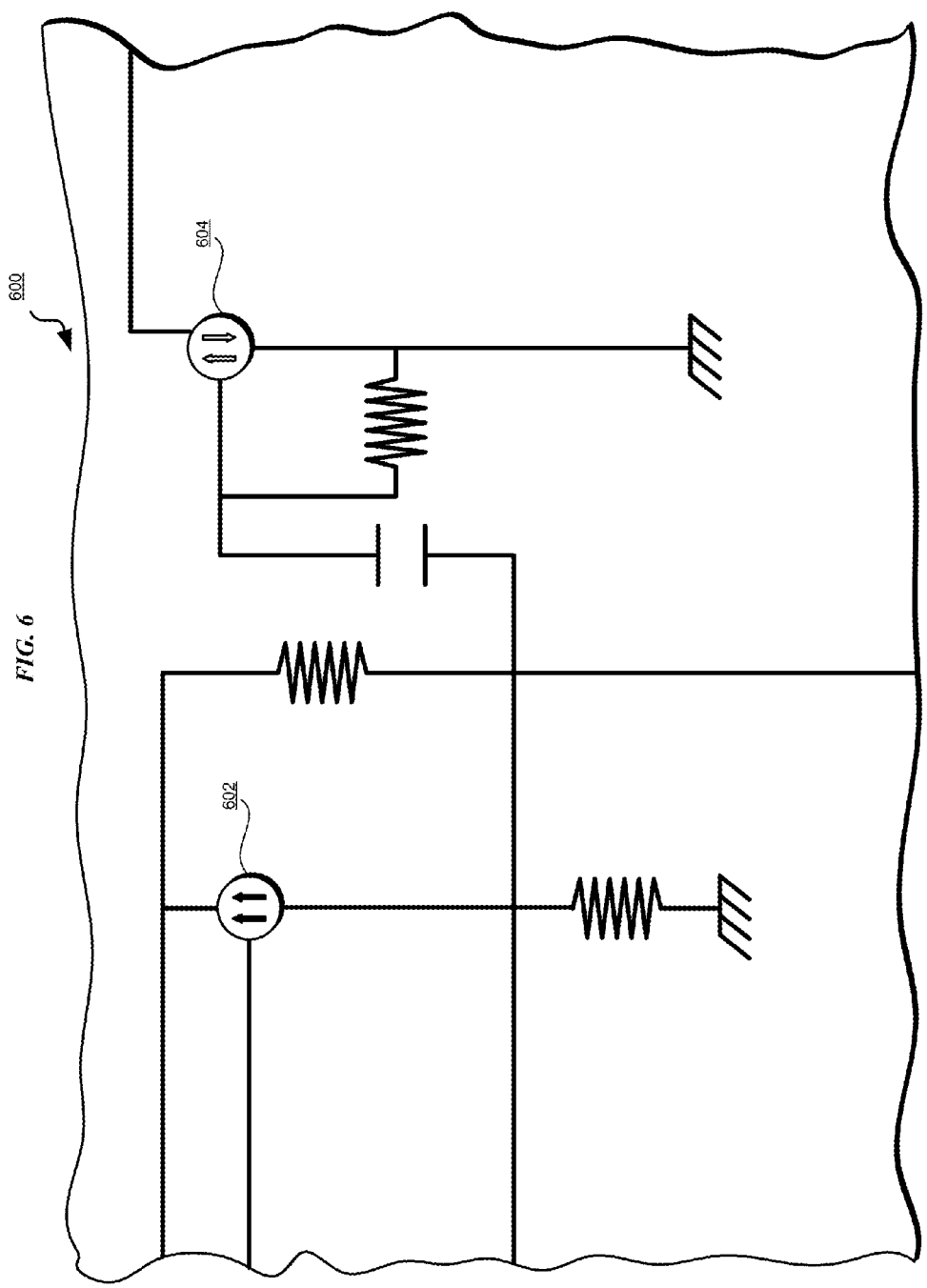
FIG. 6 depicts another example manner of visualizing sensitivity information in an IC design in accordance with an illustrative embodiment.

With reference to FIG. 6, this figure depicts another example manner of visualizing sensitivity information in an IC design in accordance with an illustrative embodiment. Design 600 may be similar to design 500 in FIG. 5.

Visualization 602 and 604 are example graphical artifacts located proximate to two components (obscured by visualization 602 and 604) in design 600. As with FIG. 5, and as generally applicable to all figures, the obscuring of the component is not limiting on the embodiments.

Some prior art methods color code the component itself to depict a particular sensitivity of the component. Advantageously, an embodiment is capable of visualizing multi-criteria and multi-dimensional aspects of the sensitivities. In other words, as to the multi-criteria aspect of an embodiment, multiple sensitivities can be visualized by a number of visual artifacts proximate to the component that is affected by those sensitivities in accordance with an embodiment. Some examples of the types and number of sensitivities that can be visualized in this manner include, but are not limited to, within-die sensitivities, die-to-die sensitivities, cross-function and cross-temperature cases of sensitivities. Any other types or number of sensitivities due to manufacturing processes variations can be visualized in this manner.

Furthermore, a visual artifact for the visualization can be multi-dimensional, to wit, of various shapes, sizes, colors, orientations, or a combination thereof. In other words, several values, conditions, or other similar aspects of a given sensitivity can be visualized using a visual artifact according to an embodiment.

Thus, an embodiment can be used to depict multi-dimensional and multi-criteria visualization of a component's numerous sensitivities on a schematic view of an IC design. Particularly, an embodiment is capable of showing multiple dimensions of a sensitivity over multi-criteria sensitivities of several components, in a succinct and intuitive manner.

As will be described subsequently in greater detail, an embodiment can further relate the multi-dimensional multi-criteria sensitivities of several components with one another. As will also be described subsequently in greater detail, the visualization according to an embodiment also provides information regarding the direction of the rectification of a component to improve a metric against a certain sensitivity of the component.

In this example, visualization 602 and 604 are shaped and shaded differently to indicate different sensitivities, different values of the same sensitivity, or a combination thereof. Furthermore, visualization 602 and 604 include additional visual artifacts, to wit, the arrows, in different numerosity as well.

For example, visualization 602 depicts two arrow shaped icons. Each arrow shaped icon can be shaded or colored differently from the other, and can represent one or more distinct manufacturing process related sensitivity. In the depicted example, the two arrows in visualization 602 as shown may indicate to a designer that the affected component, e.g., a transistor, has to be sized up to improve a metric against one sensitivity (indicated by the up direction of one arrow), and has to be sized up to improve a metric against another sensitivity as well (indicated by the up direction of the other arrow).

Similarly, the two arrows in visualization 604 as shown may indicate to a designer that the affected component, e.g., a transistor, has to be sized up to improve a metric against one sensitivity (indicated by the up direction of one arrow), and has to be sized down to improve a metric against another sensitivity (indicated by the down direction of the other arrow). As another example, the two arrows in visualization 604 may indicate that the associated component has to be sized up for improving the component's sensitivity in one corner and sized down for improving the sensitivity of the component in another corner.

Furthermore, the dark shade of the arrows (or another suitable color or shade) in visualization 602 may indicate to the designer that the sensitivity is critical beyond a threshold. Similarly, the lighter shade of the arrows (or another suitable color or shade) in visualization 604 may indicate to the designer that the sensitivity is non-critical and within the threshold. Additionally, the arrows may be of different sizes (not shown in this depiction) to indicate to the designer the different amounts of sizing up required for addressing the different sensitivities.

The shapes, sizes, colors, shades, orientations, numerosity, or placements depicted in FIG. 6 are not limiting on the embodiments. Other shapes, sizes, colors, shades, orientations, numerosity, placements, or notations in conjunction with visualizations 602 and 604 may be similarly used within the scope of the illustrative embodiments to convey these and other similar sensitivity information.

Figure 7:
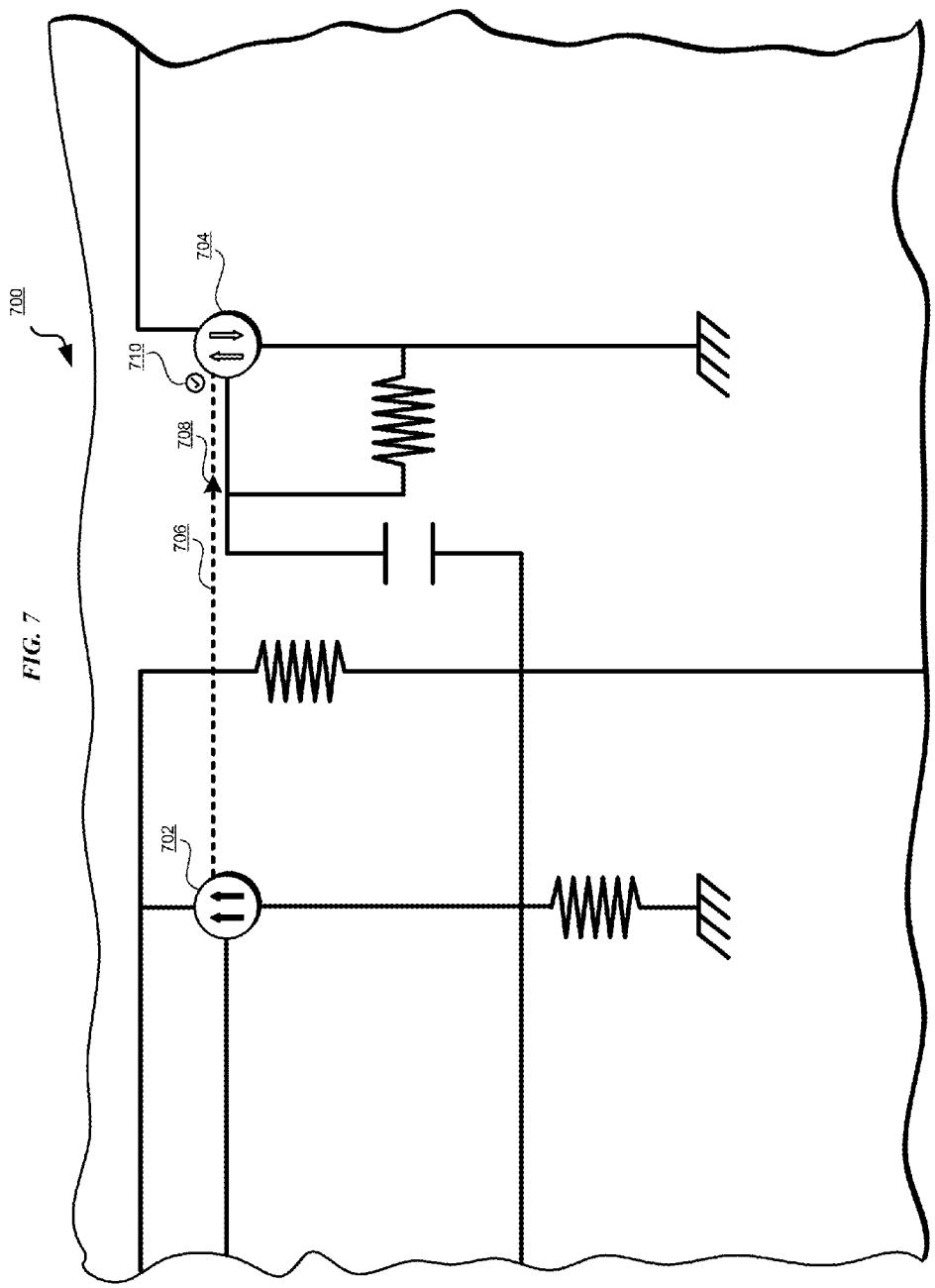
FIG. 7 depicts another example manner of visualizing sensitivity information in an IC design in accordance with an illustrative embodiment.

With reference to FIG. 7, this figure depicts another example manner of visualizing sensitivity information in an IC design in accordance with an illustrative embodiment. Design 700 may be similar to design 600 in FIG. 6. Visualization 702 and 704 may be analogous to visualization 602 and 604 respectively in FIG. 6.

Additional sensitivity information can be visualized using a combination of graphical, iconic, alphanumeric depictions. When one component is modified in design 700, the modification may affect another component's sensitivity in design 700. For example, adjusting the component associated with visualization 702 may affect the sensitivity of the component associated with visualization 704. For example, if an nfet is enlarged in an inverter whose ratio matters, then the change in performance achieved by a change in the inverter's pfet may become smaller. Specifically, for example, sizing up a transistor associated with visualization 702 in response to a sensitivity information may favorably affect the sensitivity of another transistor associated with visualization 704 such that that transistor may have to be sized up by a smaller proportion than suggested by visualization 704.

Such relationships between sensitivity information of two or more components, between two or more components themselves, between the visualizations of the sensitivity information of two or more components, or a combination thereof, can also be depicted using visual artifacts in the IC design. As an example, dotted line 706 connects visualization 702 and 704 to indicate that a relationship exists between the two components' sensitivities. Arrowhead 708 on line 706 further indicates that addressing the sensitivity of the component of visualization 702 affects the sensitivity of the component of visualization 704 Indicator 710 further indicates that the affect of addressing the sensitivity of the component of visualization 702 is favorable to the sensitivity of the component of visualization 704. Under certain circumstances, more sensitivity can be favorable. For example, a change that makes a component's performance more sensitive to power supply voltage is desirable if raising the power supply voltage is being contemplated.

In an example implementation of an embodiment, some components may be related because they act together functionally. One example of how components may act together is in analog circuits where two transistors have to be "matched," i.e., their layout is done in a careful way so that they have the same characteristics when they are manufactured. For example, while their channel lengths may vary from the design specification, these related transistors will vary in the same way so that the transistors remain matched.

Similarly, other components, such as resistors, may also have to be matched. In such example cases, an embodiment may place the visual rendering in between the related components. In other words, the visual rendering is so situated in the design schematic that the rendering is identifiable as being associated with all the related components.

For example, an embodiment may visualize the sensitivity to how well the components match to a certain process variation or environmental parameter, such as a supply voltage level or temperature. Another example of how components may relate to one another is when a ratio of a parameter of the components determines a performance metric.

For example, a circuit's performance may be affected by the fall-time of the output of an inverter, where the fall-time is determined by a ratio of the strength of the PFET and NFET devices that make up the inverter. In that case an embodiment may place a visual rendering that captures that sensitivity of the ratio to a given manufacturing or environmental parameter between the two transistors on the schematic. Alternatively, an embodiment may depict a rendering, such as the dotted lines shown in this figure, which conveys the information, for example, that weakening the PFET has the same effect as strengthening the NFET.

Note that the related components need not be situated adjacent to each other in the schematic, or even in the same "view" of the schematic. For such related components, a visualization may not be placed between related components but other manners of depicting the relationship may be used within the scope of the embodiments. For example, a symbol indicating the relation may be positioned proximate to the related components such that the appearance or presence of the symbols indicates that the components act together or are otherwise related, to determine the value of a metric. For example, a label "g1" placed relative to all components in a group of related components may indicate that the components are related to each other in group 1. Such alternative manner of depicting relationships may be useful where visualization, such as a dotted line, would have to cover significant distance in the schematic, or overlap with other symbols or visualizations, or may be of a numerosity to be distracting on the schematic. Thus, an embodiment can not only depict the sensitivities related to individual components, but also, sensitivity-related relationships between two or more components in a given design.

Figure 8:
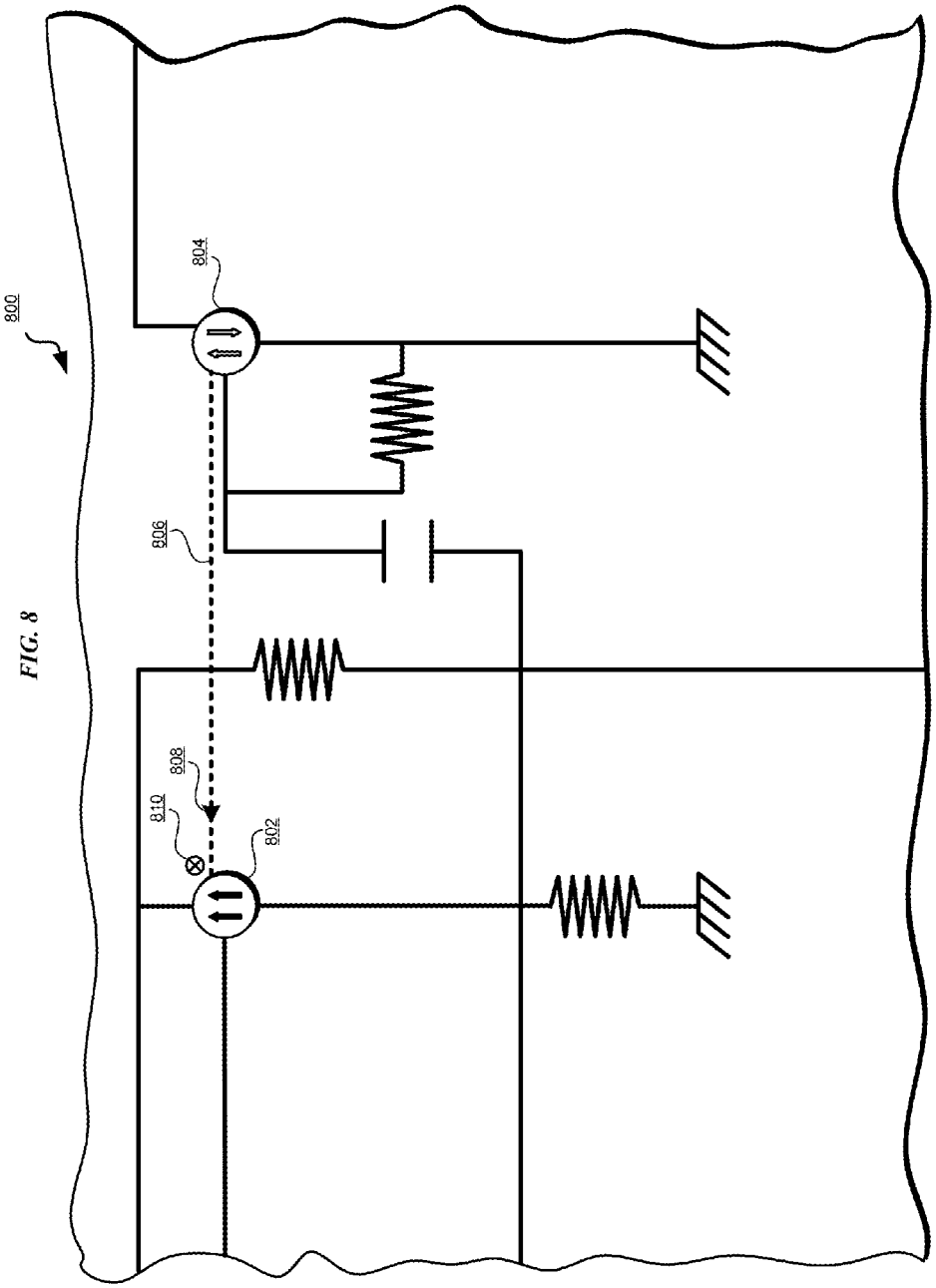
FIG. 8 depicts another example manner of visualizing sensitivity information in an IC design in accordance with an illustrative embodiment.

With reference to FIG. 8, this figure depicts another example manner of visualizing sensitivity information in an IC design in accordance with an illustrative embodiment. Design 800 may be similar to design 700 in FIG. 7. Visualization 802 and 804 may be analogous to visualization 702 and 704 respectively in FIG. 7.

As another example, dotted line 806 connects visualization 802 and 804 to indicate that a relationship exists between the two components' sensitivities. Arrowhead 808 on line 806 further indicates that addressing the sensitivity of the component of visualization 804 affects the sensitivity of the component of visualization 802. Indicator 810 further indicates that the affect of addressing the sensitivity of the component of visualization 804 is adverse to the sensitivity of the component of visualization 802.

A variation in a metric relevant to a component may cause a variation in another metric relevant to that component, another group of components, or the circuit as a whole. As an example, processing variation can change the channel length or width of a transistor, where the transistor is the component and the width is the characteristic. The variation can also change a property of the larger circuit or a group of components of which the component is part. For example, a change in threshold voltage or the width of a transistor can change the power dissipated by the circuit.

Generally, circuits are designed block by functional block. Thus, using the above example, the power dissipated may be the power dissipation of a block of which the component is a part, but not necessarily the whole circuit. For example, a processor circuit may include a floating point computation unit as a functional block. The floating point functional unit may include a transistor whose threshold voltage may have changed. The change in the power dissipation may correspond to the change in the power dissipation of the floating point unit, rather than the power dissipation of the entire processor circuit.

Furthermore, the processing variations may be relative to not just a value as designed in an IC design, but relative to any value that is set. For example, a designer may want to explore the sensitivity of drive current of a transistor as a function of supply voltage at different temperatures. The designer may be trying to choose a supply voltage from many choices, so any given supply voltage with which to determine the drive current or other characteristics of other components is not necessarily a design specification but merely set for a particular iteration of the exploration. As another example, the designer might be evaluating the sensitivity of a transistor's drive current to supply voltage at different temperatures, knowing that the transistor will not receive the nominal supply voltage at which the circuit is powered because of losses in the power grid supplying the transistor, but the designer might not know what voltage to expect. Thus, the designer may set different voltages to explore the variations caused by the various supply voltage values—at certain operating points.

Figure 9:
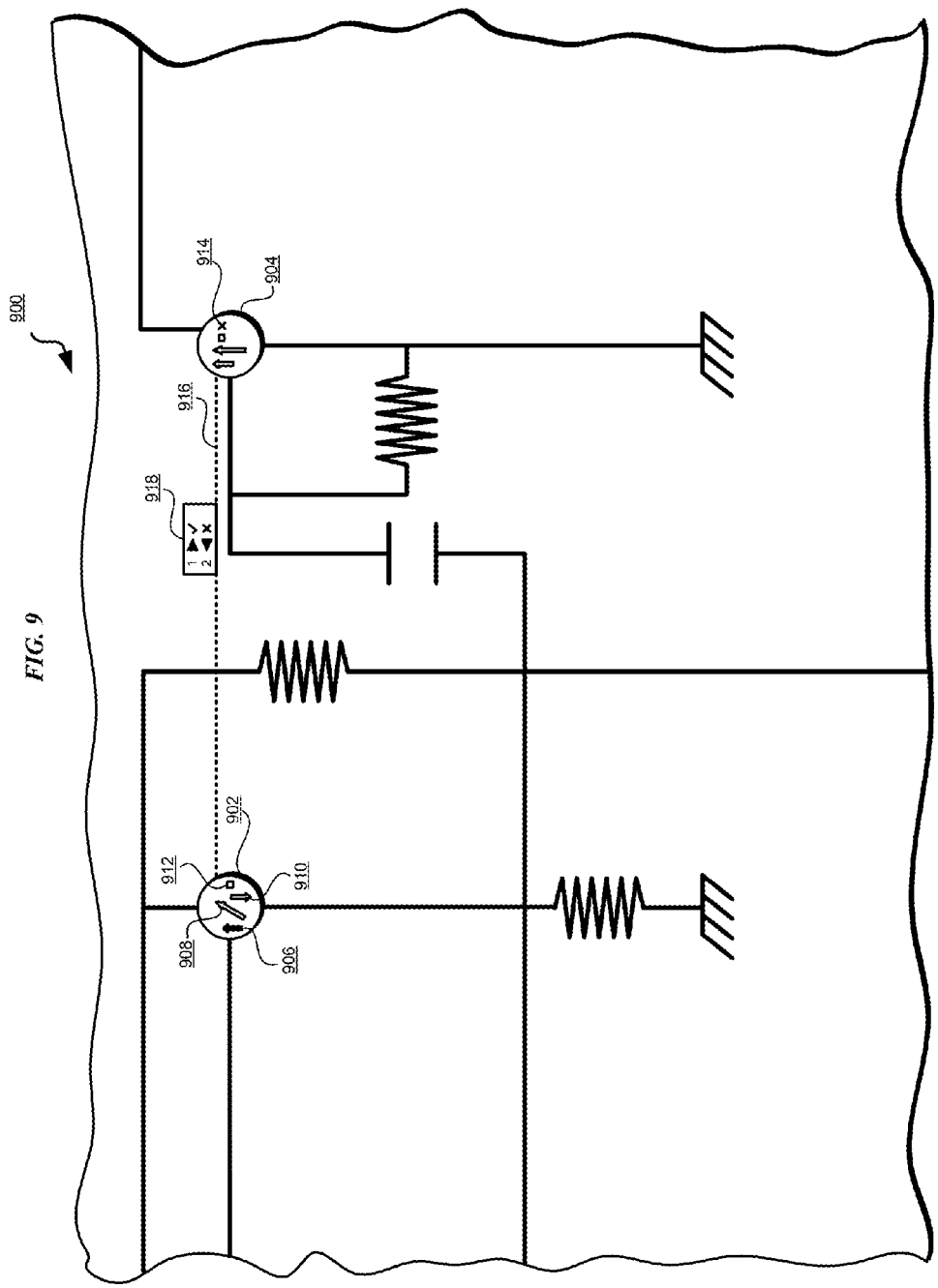
FIG. 9 depicts another example manner of visualizing sensitivity information in an IC design in accordance with an illustrative embodiment.

With reference to FIG. 9, this figure depicts another example manner of visualizing sensitivity information in an IC design in accordance with an illustrative embodiment. Design 900 may be similar to design 800 in FIG. 8. Visualization 902 and 904 may be analogous to visualization 802 and 804 respectively in FIG. 8.

A visualization according to an embodiment may be further modified with additional information. For example, dark colored up arrow 906 in visualization 902 may indicate to a designer that for the associated component a first sensitivity is above a threshold and is directly addressed by a increase in size of the component. As another example, light colored diagonal arrow 908 in visualization 902 may indicate to the designer that for the associated component a second sensitivity is above a second threshold and is proportionally addressed by a increase in size of the component.

As another example, light colored down arrow 910 in visualization 902 may indicate to the designer that for the associated component the sensitivity to a third manufacturing process related variation is above another threshold and is directly addressed by a decrease in size of the component. As another example, blank rectangle 912 in visualization 902 may indicate to the designer that for the associated component the sensitivity to a fourth manufacturing process related variation is within a defined threshold and need not be addressed. As another example, symbol 914 in visualization 904 may indicate to the designer that for the associated component the sensitivity to the fourth manufacturing process related variation is irrelevant.

Dotted line 916 connects visualization 902 and 904 to indicate that a relationship exists between the two components' sensitivities. Information block 918 may use a combination of graphical and textual information to communicate the various relationships. For example, block 918 as depicted indicates to the designer that for the sensitivity to the first manufacturing process related variation, modifying the component of visualization 902 favorably affects the need for modification to the component of visualization 904, and for the sensitivity to the second manufacturing process related variation, modifying the component of visualization 904 adversely affects the need for modification to the component of visualization 902.

Figure 10:
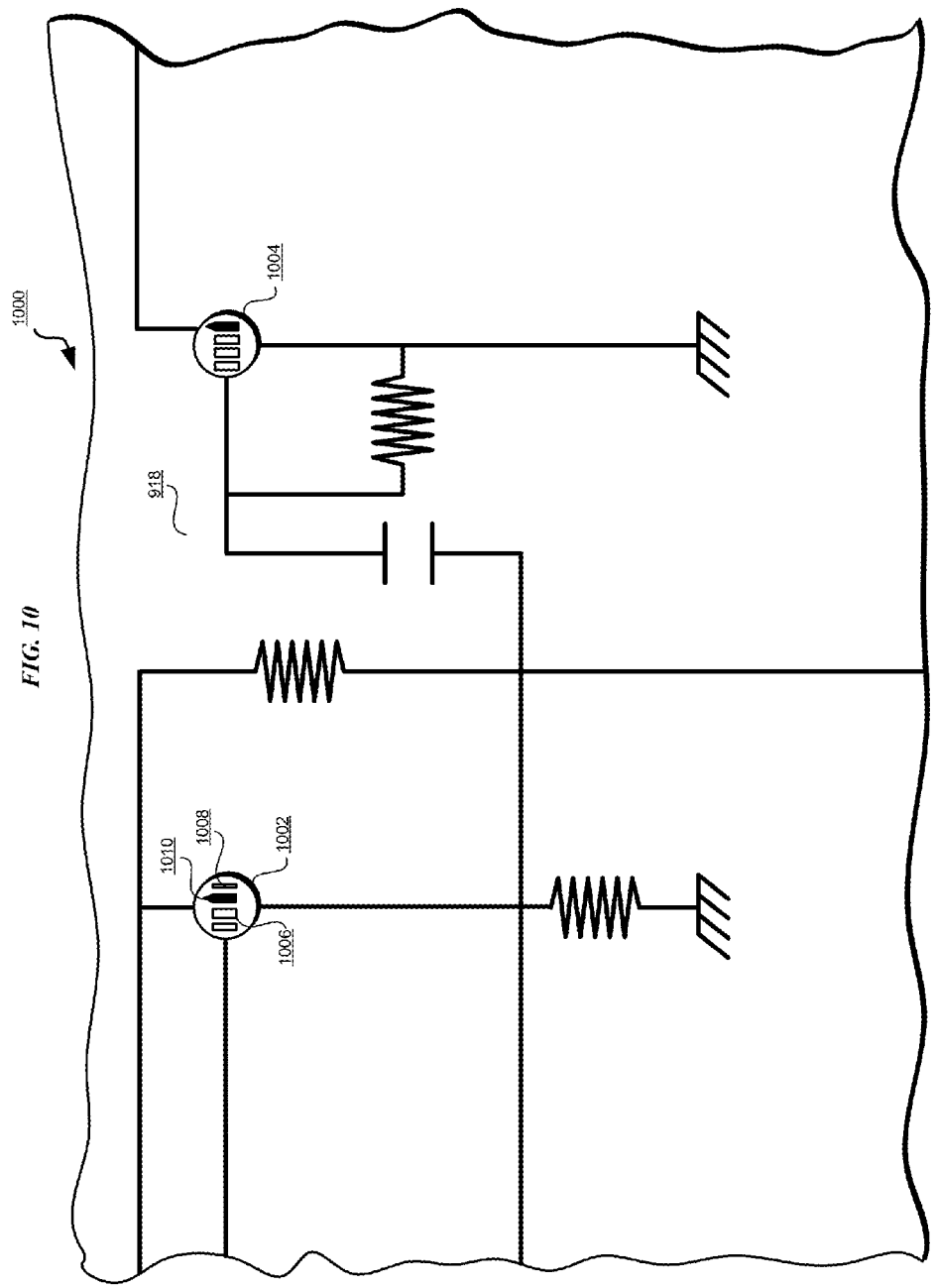
FIG. 10 depicts another example manner of visualizing sensitivity information in an IC design in accordance with an illustrative embodiment.

With reference to FIG. 10, this figure depicts another example manner of visualizing sensitivity information in an IC design in accordance with an illustrative embodiment. Design 1000 may be similar to design 900 in FIG. 9. Visualization 1002 and 1004 may be analogous to visualization 902 and 904 respectively in FIG. 9.

The visualization may be further modified with additional information. For example, wide light colored rectangle 1006 may indicate to a designer that for the associated component the sensitivity measured using a second metric is above a threshold by a factor corresponding to the color and width of rectangle 1006. As another example, narrow light colored rectangle 1008 may indicate to the designer that for the associated component the sensitivity measured using a fourth metric is above a threshold by a factor corresponding to the color and width of rectangle 1008. As another example, dark colored up arrow 1010 in visualization 1002 may indicate to the designer that for the associated component the sensitivity measured using a third metric is above another threshold and is directly addressed by an increase in size of the component. Different widths or other features of rectangles 1006, 1008, and 1010, even if of the same color, may represent different levels of sensitivities. Sensitivities may be measured using different metrics, such as a "write-0" sensitivity in a strong-n weak-p corner in one case and a "write-1" sensitivity in a weak-n strong-p corner in another, or drive-current sensitivity to supply voltage at different temperatures, or other similar representations.

The shapes, sizes, colors, shades, orientations, numerosity, icons, line type, or placements depicted in the figures are not intended to be limiting on the embodiments. Other manners of depicting relationships between the various sensitivities will be apparent from this disclosure to those of ordinary skill in the art and the same are contemplated within the scope of the illustrative embodiments. Furthermore, the relationships can be identified and quantified using any logic suitable for the particular design tool being used in conjunction with the sensitivity information according to an embodiment.

Figure 11:
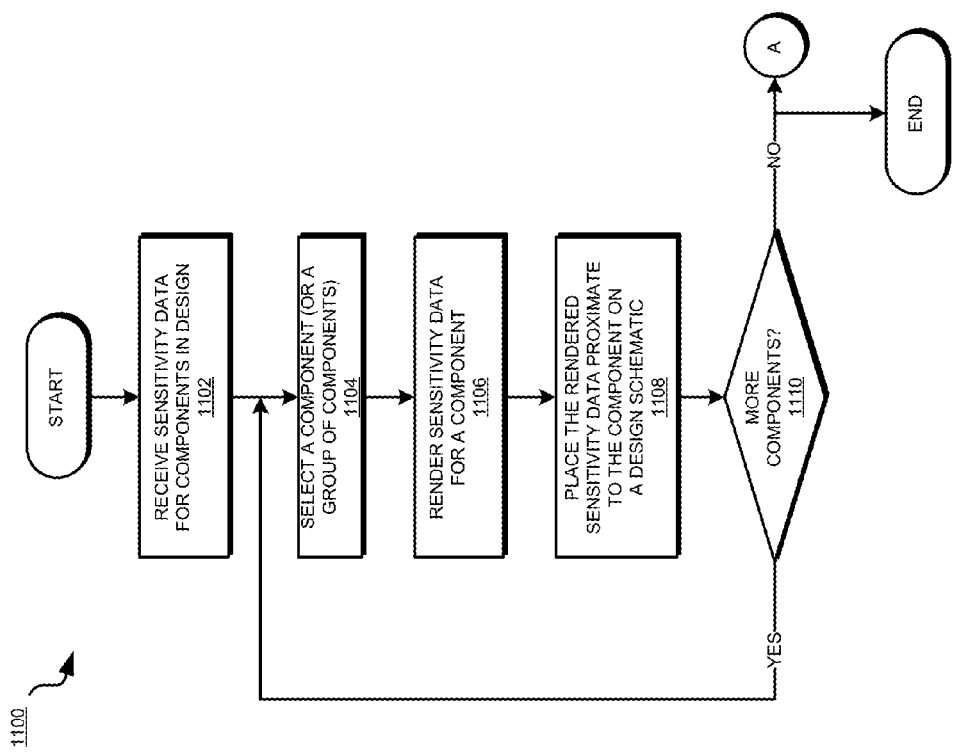
FIG. 11 depicts a flowchart of an example process of visualizing sensitivity information in an IC design in accordance with an illustrative embodiment.

With reference to FIG. 11, this figure depicts a flowchart of an example process of visualizing sensitivity information in an IC design in accordance with an illustrative embodiment. Process 1100 may be implemented in application 107 in FIG. 1.

Process 1100 begins by receiving sensitivity information for one or more components in a given IC design (step 1102). Process 1100 selects a component or a group of components (step 1104). Process 1100 visually renders (creates the visualization) the sensitivity information pertaining to the selected component or group of components, such as in the matching example, (step 1106). Process 1100 places the rendered sensitivity information (visualization) proximate to the selected component on a schematic of the IC design (step 1108).

Process 1100 determines whether more components remain in the IC design for which sensitivity information has to be visually rendered (step 1110). If more components remain ("Yes" path of step 1110), process 1100 returns to step 1104. If no more components remain for which sensitivity information has to be visualized ("No" path of step 1110), process 1100 may either end thereafter, or exit at exit point marked "A" to enter another process having a corresponding entry point marked "A".

With reference to FIG. 12, this figure depicts a flowchart of an example process of actuating sensitivity information visualization in accordance with an illustrative embodiment. Process 1200 may be implemented in application 107 in FIG. 1.

Process 1200 begins by determining an action to be taken on a component based on the sensitivity information associated with the component (step 1202). As an example, a component may be a transistor. An action with respect to the transistor, based on the sensitivity information associated with the transistor, may be to increase the size of the transistor by a specific value. Another example may be to change the transistor's Vt-type. Note that an action taken with respect to a component in this manner utilizes the multi-criteria and multi-dimensional aspect of the various sensitivities of the component. For example, when conflicting actions are required by sensitivities to different criteria, or when the different dimensions of those sensitivities to the different criteria, such as depicted by the shape, size, orientation, or the coloration of the visualizations, the action is adapted to reach a solution that is an acceptable compromise for the multi-criteria sensitivities.

Process 1200 executes the action, such as when a designer makes the design manipulations (step 1204). Process 1200 may recalculate sensitivity data, such as upon a designer's request after a design manipulation (step 1206). Process 1200 may re-render the recomputed sensitivity data (step 1208). Process 1200 ends thereafter.

With reference to FIG. 13, this figure depicts a flowchart of an example process of visualizing sensitivity information in an IC design in accordance with an illustrative embodiment. Process 1300 may be implemented in application 107 in FIG. 1.

Process 1300 begins by determining interdependency between the sensitivity information of two or more components (step 1302). Process 1300 renders the interdependency using the visualizations of the sensitivity information of the two or more components, such as depicted in FIGS. 8 and 9 (step 1304). Process 1300 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for visualizing sensitivity information in IC design. Using an embodiment of the invention, information pertaining to manufacturing process variation related sensitivities of components in the IC design can be depicted on the design schematic. The visual depiction of sensitivity information in this manner may facilitate manual, semi-automatic, or automatic modification of the design to alleviate those sensitivities.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer readable storage device," and computer-readable storage device" do not encompass a signal propagation medium such as a copper cable, optical fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for visualizing sensitivity information in an integrated circuit (IC) design, the method comprising:
   receiving, at an application executing in a data processing system, a plurality of sensitivity information corresponding to a first component in the IC design, wherein the plurality of sensitivity information includes a first sensitivity information indicating a first variation in a first electrical characteristic of a group of components in the IC design as a result of a variation in an electrical characteristic of the first component in the IC design, wherein the plurality of sensitivity information corresponding to the first component is a multi-criteria sensitivity information corresponding to the first component, wherein the multi-criteria sensitivity information includes the first sensitivity information corresponding to the first component and a second sensitivity information corresponding to the first component, wherein the first sensitivity information of the first component corresponds to a first sensitivity criterion of the first component and the second sensitivity information of the first component corresponds to a second sensitivity criterion of the first component;
   receiving a set of plurality of sensitivity information for a set of components in the IC design, wherein the set of plurality of sensitivity information includes the plurality of sensitivity information corresponding to the first component and the set of components includes the first component;
   rendering a plurality of aspects of the first sensitivity information in visual form to form a first visualization; and
   presenting the first visualization on a schematic view of the IC design in an IC design tool such that the first sensitivity information is visually associated with the first component in the IC design.

2. The computer implemented method of claim 1, wherein the first sensitivity information indicates a variation between the electrical characteristic of the first component as observed and the electrical characteristic of the first component as set in the IC design.

3. The computer implemented method of claim 1, further comprising:
   receiving a second sensitivity information corresponding to a second component in the IC design;
   identifying an interdependency between the first and the second sensitivity information; and
   rendering the interdependency on the schematic view of the IC design in the IC design tool.

4. The computer implemented method of claim 3, wherein the rendering the interdependency further comprises:
   indicating on the schematic view that manipulating the first component responsive to the first sensitivity information affects a sensitivity of the second component.

5. The computer implemented method of claim 3, wherein the presenting of the first visualization is such that the first visualization is visually associated with the interdependency.

6. The computer implemented method of claim 1, wherein the rendering further comprises:
   selecting a first aspect of the first sensitivity information, the first aspect representing the first variation;
   determining, forming a threshold determination, whether the first variation exceeds a threshold;
   identifying, responsive to the first variation exceeding the threshold, a first manipulation of the first component to bring the variation below the threshold;
   converting information representing the threshold determination and the first manipulation to a graphical form.

7. The computer implemented method of claim 1, wherein rendering the plurality of aspects of the first sensitivity information in a multi-dimensional visual form comprises:
   representing a first aspect from the plurality of aspects of the first sensitivity information using a first color of a first shape;
   representing a second aspect from the plurality of aspects of the first sensitivity information using a first orientation of the first shape;
   representing a third aspect from the plurality of aspects of the first sensitivity information using a first size of the first shape.

8. A computer usable program product comprising a computer-readable storage device including computer usable code for visualizing sensitivity information in an integrated circuit (IC) design, the computer usable code comprising:

computer usable code for receiving, at an application executing in a data processing system, a plurality of sensitivity information corresponding to a first component in the IC design, wherein the plurality of sensitivity information includes a first sensitivity information indicating a first variation in a first electrical characteristic of a group of components in the IC design as a result of a variation in an electrical characteristic of the first component in the IC design, wherein the plurality of sensitivity information corresponding to the first component is a multi-criteria sensitivity information corresponding to the first component, wherein the multi-criteria sensitivity information includes the first sensitivity information corresponding to the first component and a second sensitivity information corresponding to the first component, wherein the first sensitivity information of the first component corresponds to a first sensitivity criterion of the first component and the second sensitivity information of the first component corresponds to a second sensitivity criterion of the first component;

computer usable code for receiving a set of plurality of sensitivity information for a set of components in the IC design, wherein the set of plurality of sensitivity information includes the plurality of sensitivity information corresponding to the first component and the set of components includes the first component;

computer usable code for rendering a plurality of aspects of the first sensitivity information in visual form to form a first visualization; and computer usable code for presenting the first visualization on a schematic view of the IC design in an IC design tool such that the first sensitivity information is visually associated with the first component in the IC design.

9. The computer usable program product of claim 8, wherein the first sensitivity information indicates a variation between the electrical characteristic of the first component as observed and the electrical characteristic of the first component as set in the IC design.

10. The computer usable program product of claim 8, further comprising:
computer usable code for receiving a second sensitivity information corresponding to a second component in the IC design;
computer usable code for identifying an interdependency between the first and the second sensitivity information; and
computer usable code for rendering the interdependency on the schematic view of the IC design in the IC design tool.

11. The computer usable program product of claim 10, wherein the computer usable code for rendering the interdependency further comprises:
computer usable code for indicating on the schematic view that manipulating the first component responsive to the first sensitivity information affects a sensitivity of the second component.

12. The computer usable program product of claim 10, wherein the presenting of the first visualization is such that the first visualization is visually associated with the interdependency.

13. The computer usable program product of claim 8, wherein the computer usable code for rendering further comprises:
computer usable code for selecting a first aspect of the first sensitivity information, the first aspect representing the first variation;
computer usable code for determining, forming a threshold determination, whether the first variation exceeds a threshold;
computer usable code for identifying, responsive to the first variation exceeding the threshold, a first manipulation of the first component to bring the variation below the threshold;
computer usable code for converting information representing the threshold determination and the first manipulation to a graphical form.

14. The computer usable program product of claim 8, wherein the computer usable code for rendering the plurality of aspects of the first sensitivity information in a multi-dimensional visual form comprises:
computer usable code for representing a first aspect from the plurality of aspects of the first sensitivity information using a first color of a first shape;
computer usable code for representing a second aspect from the plurality of aspects of the first sensitivity information using a first orientation of the first shape;
computer usable code for representing a third aspect from the plurality of aspects of the first sensitivity information using a first size of the first shape.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for visualizing sensitivity information in an integrated circuit (IC) design, the data processing system comprising:
a storage device including a storage medium, wherein the storage device stores computer usable program code; and
a processor, wherein the processor executes the computer usable program code, and wherein the computer usable program code comprises:
computer usable code for receiving, at an application executing in a data processing system, a plurality of sensitivity information corresponding to a first component in the IC design, wherein the plurality of sensitivity information includes a first sensitivity information indicating a first variation in a first electrical characteristic of a group of components in the IC design as a result of a variation in an electrical characteristic of the first component in the IC design, wherein the plurality of sensitivity information corresponding to the first component is a multi-criteria sensitivity information corresponding to the first component, wherein the multi-criteria sensitivity information includes the first sensitivity information corresponding to the first component and a second sensitivity information corresponding to the first component, wherein the first sensitivity information of the first component corresponds to a first sensitivity criterion of the first component and the second sensitivity information of the first component corresponds to a second sensitivity criterion of the first component;
computer usable code for receiving a set of plurality of sensitivity information for a set of components in the IC design, wherein the set of plurality of sensitivity information includes the plurality of sensitivity information corresponding to the first component and the set of components includes the first component;

computer usable code for rendering a plurality of aspects of the first sensitivity information in visual form to form a first visualization; and computer usable code for presenting the first visualization on a schematic view of the IC design in an IC design tool such that the first sensitivity information is visually associated with the first component in the IC design.

18. The data processing system of claim 17, wherein the first sensitivity information indicates a variation between the electrical characteristic of the first component as observed and the electrical characteristic of the first component as set in the IC design.

19. The data processing system of claim 17, further comprising:

computer usable code for receiving a second sensitivity information corresponding to a second component in the IC design;

computer usable code for identifying an interdependency between the first and the second sensitivity information; and computer usable code for rendering the interdependency on the schematic view of the IC design in the IC design tool.

20. The data processing system of claim 19, wherein the computer usable code for rendering the interdependency further comprises:

computer usable code for indicating on the schematic view that manipulating the first component responsive to the first sensitivity information affects a sensitivity of the second component.

21. The data processing system of claim 19, wherein the presenting of the first visualization is such that the first visualization is visually associated with the interdependency.

22. The data processing system of claim 17, wherein the computer usable code for rendering further comprises:

computer usable code for selecting a first aspect of the first sensitivity information, the first aspect representing the first variation;

computer usable code for determining, forming a threshold determination, whether the first variation exceeds a threshold;

computer usable code for identifying, responsive to the first variation exceeding the threshold, a first manipulation of the first component to bring the variation below the threshold;

computer usable code for converting information representing the threshold determination and the first manipulation to a graphical form.

* * * * *